United States Patent [19]

Bosshart

[11] Patent Number: 5,504,867
[45] Date of Patent: Apr. 2, 1996

[54] HIGH SPEED MICROPROCESSOR BRANCH DECISION CIRCUIT

[75] Inventor: Patrick W. Bosshart, Plano, Tex.

[73] Assignee: Texas Instruments Incorporated, Dallas, Tex.

[21] Appl. No.: 953,637

[22] Filed: Sep. 29, 1992

[51] Int. Cl.$^6$ .............................. G06F 9/22; G06F 9/302
[52] U.S. Cl. ...................... 395/375; 364/258; 364/259.1; 364/261.3; 364/262.8; 364/DIG. 1
[58] Field of Search .......................... 395/375; 364/736.5

[56] References Cited

U.S. PATENT DOCUMENTS

| | | | |
|---|---|---|---|
| 4,947,369 | 8/1990 | Thoma et al. | 395/375 |
| 5,020,016 | 5/1991 | Nakano et al. | 364/736.5 |
| 5,247,627 | 9/1993 | Murakami et al. | 395/375 |

FOREIGN PATENT DOCUMENTS

0180005A2  5/1986  European Pat. Off. .

*Primary Examiner*—Vincent N. Trans
*Assistant Examiner*—Ayni Mohamed
*Attorney, Agent, or Firm*—Brian C. McCormack; James C. Kesterson; Richard L. Donaldson

[57] ABSTRACT

In accordance with the present invention, a circuit 50 for providing a branch decision signal based on the results of an arithmetic or logic operation is described. The circuit comprises at least two candidate branch decision circuits 52,54, 56,58, each for computing a candidate branch decision signal, each assuming a unique candidate condition code for at least one of the alu status signals. The circuit further comprises a first selection circuit 62,64,66 for selecting from the candidate branch decision signals a proper branch decision signal based on the alu status signal at such time as the status signal becomes valid. Other devices, systems and methods are also disclosed.

6 Claims, 9 Drawing Sheets

HIGH SPEED MICROPROCESSOR BRANCH DECISION CIRCUIT

CROSS-REFERENCE TO RELATED PATENTS

| Pat No./Appl. No. | Filing Date   | TI Case No. |
|-------------------|---------------|-------------|
| 4,815,019         | Feb. 26,1987  | TI-12438    |
| 5,270,955         | July 31, 1992 | TI-16056    |
| 071923,282        | July 31, 1992 |             |

FIELD OF THE INVENTION

This invention generally relates to microprocessor branch decision circuits.

BACKGROUND OF THE INVENTION

Without limiting the scope of the invention, the background of the invention is described in connection with the "SPARC" reduced instruction set computer (RISC) architecture, as an example.

Heretofore, in this field, branch decisions have been based on ALU output status signals or condition codes ALU=0, ALU overflow, ALU output negative, and ALU carry-out. In typical prior art architectures, the ALU produces these status signals at about the same time it can produce its sum output. In highly optimized prior art branch decision circuits, the branch decision or jump-taken signal is produced within five or six gate delays from availability of these status signals. Further delay in prior art "SPARC" branch decision circuits is incurred in computation of the alu-overflow status signal, which is a logical OR of the arithmetic overflow and tagged overflow (a feature specific to the "SPARC" architecture). This logical OR adds an additional gate delay. Still further delay is incurred in prior art branch decision circuits due to the "SPARC" architecture's definition of alu-carryout polarity. The "SPARC" architectures defines the polarity of the carry-out signal to be reversed upon subtract operations relative to the polarity for add operations. This need necessitates a logical INVERT when testing for the condition of alu-carryout of a subtract operation. This logical INVERT adds an additional gate delay.

Another source of delay in prior art branch decision circuits designed in accordance with the "SPARC" architecture stems from using a condition code which is set by ALU operations and used by subsequent branch instructions. In typical pipelined implementations if the instruction preceding a branch decision modifies the condition code, then the ALU produces the condition code in the same clock cycle in which the subsequent branch decision is made. If the condition code is instead set by an instruction not immediately preceding the branch decision, the condition code must be read from a condition code register. As such, the ALU must choose to use either the ALU output status signals or the status signals stored in the condition code register. This choice is typically made using a forwarding mux, adding another gate delay to the branch decision for the prior art circuit.

SUMMARY OF THE INVENTION

Although the invention and preferred embodiments thereof are discussed in relation to the "SPARC" architecture, the invention as claimed applies to any computer architecture which makes branch decisions based on these or similar ALU output status signals. Various modifications and combinations of the illustrative embodiments, as well as other embodiments of the invention, will be apparent to persons skilled in the art upon reference to the description. It is therefore intended that the appended claims encompass any such modifications or embodiments.

In prior art branch decision circuits, status signals and control signals are received by inputs of combinatorial logic circuitry. The combinatorial logic in these prior art circuits acts on these signals and once the inputs propagate through the levels of gates (typically five or six levels of gates in highly optimized prior art circuits), a branch decision signal becomes available. As previously mentioned, in addition to the minimal number of gates necessary for a general branch decision, specific implementations such as the "SPARC" incur further delays by requiring the status signals or condition code to propagate through additional processor-specific conditions such as the inversion of alu-carryout for subtract operations and mux forwarding.

The present invention in its preferred embodiments in large measure overcomes the aforementioned difficulties and serves to eliminate or greatly reduce the delay from computation of the ALU sum output (or output from any ALU operation, logical or arithmetic) to availability of the branch decision. The present invention recognizes that while the branch decision signal is dependent upon ALU status signals, the branch decision circuit can be structured such that a large measure of the computation of the branch decision signal can be carried out prior to availability of these status signals, in parallel with the sum (or other operation) computation.

In a first preferred embodiment of the present invention, the branch decision circuit is structured such that late-arriving signals determine the critical timing path for availability of the branch decision signal. For the purposes of this embodiment the late-arriving signals will preferably indicate a zero result of an alu operation for which the signal name shall be "ALU0" or a carry-in to the most significant bit (MSB) of the ALU for which the signal name shall be "cin31". In this preferred embodiment, the aforementioned late-arriving status signals are valid slightly prior to availability of the computation result. The branch decision signal in this preferred embodiment may become valid within one or two gate delays from the arrival of the later of the ALU0 and cin31 signals. This branch decision becomes valid independently of the computation result.

In another preferred embodiment of the present invention, the branch decision circuit may be structured such that it is consistent with a carry-select adder/ALU. This structure is fundamentally the same as the first preferred embodiment, differing only slightly in that two additional late-arriving signals, cin31h and cin31l, must be accommodated as candidate carry-in signals from the MSB stages of the adder and gcin is used instead of cin31. In other words, since the carry-in from the LSB stage of the adder selects between two high MSB banks, in order to avoid waiting for the carry-in to become valid for computation, values must be assumed for each of the high MSB banks and proper selection of the candidate branch decisions must be made when actual carry-in values become available.

Embodiments of the present invention are described herein in applications adapted for use with carry-lookahead adders, carry-select adders, and conditional sum adders. Many other embodiments of the present invention are possible. In some applications, other logic needed to produce the branch decision signals will add additional delay such that the late-arriving signals no longer determine the critical timing path. The invention may still be applied in these instances to result in substantial performance gains over prior art devices. The invention may be easily applied to other types of adders and ALUs, such as for a conditional sum adder as described by Sklansky, J., "Conditional-Sum Addition Logic," *IRE Transactions on Electronic Computers*, Vol. EC-9, June 1960, pp 226–231. Application of this invention to other types of adders and ALUs will be obvious to one of ordinary skill in the art of the design of computer architectures.

Preferably, the invention would be used advantageously with fast ALU=0 circuit to make full use of the invention's performance advantage. A possible fast ALU=0 circuit is described by Bosshart, et al. in U.S. Pat. No. 5,270,955, although many other ALU=0 circuits could be advantageously applied to the invention described herein.

In accordance with the present invention, a circuit for providing a branch decision signal based on the results of an arithmetic or logic operation is described. The circuit comprises at least two candidate branch decision circuits, each for computing a candidate branch decision signal, each assuming a unique candidate condition code for at least one of the alu status signals. The circuit further comprises a first selection circuit for selecting from the candidate branch decision signals a proper branch decision signal based on the alu status signal at such time as the status signal becomes valid.

BRIEF DESCRIPTION OF THE DRAWINGS

In the drawings.

Corresponding numerals and symbols in the different figures refer to corresponding parts unless otherwise indicated.

DETAILED DESCRIPTION OF PREFERRED EMBODIMENTS

Figure 1:
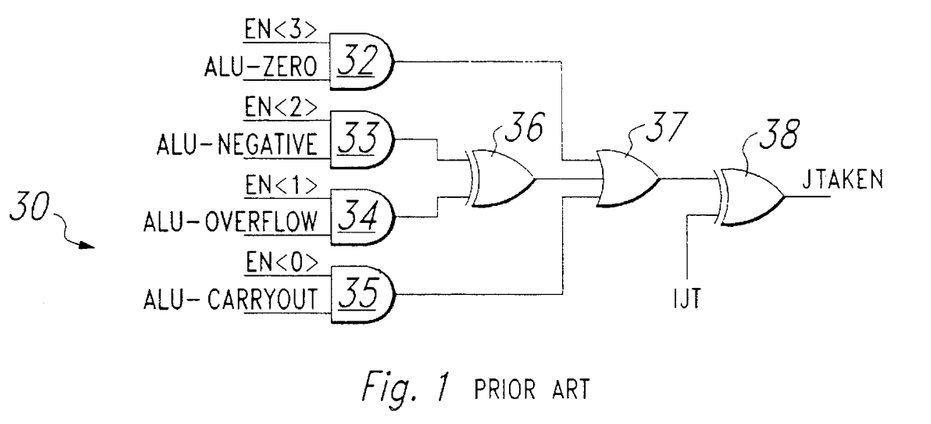
FIG. 1 is a schematic diagram of a first prior art branch decision circuit.

A first prior art branch decision circuit 30 is schematically illustrated in FIG. 1. The gates are chosen in this prior art branch decision circuit 30 to be consistent with a register transfer level (RTL) description. Gating of the appropriate branch conditions alu-zero, alu-negative, alu-overflow, and alu-carryout is accomplished by EN<3:0> in cooperation with AND gates 32,33,34,35 as depicted in FIG. 1. EXOR gate 36, 3 input OR gate 37, and EXOR gate 38 cooperate to produce a branch decision signal JTAKEN as depicted in FIG. 1 and as described below:

$$JTAKEN = IJT \oplus (EN<3>.alu\text{-}zero + (EN<2>.alu\text{-}negative \oplus EN<1>.alu\text{-}overflow) + EN<0>.alu\text{-}carryout)$$

Figure 2:
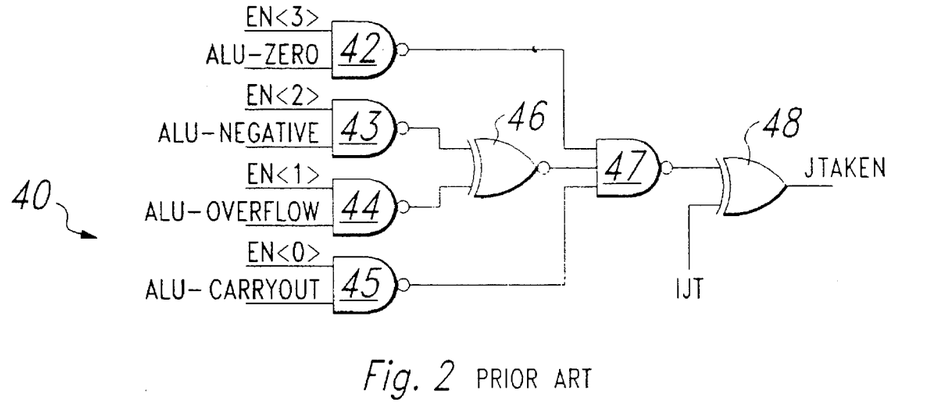
FIG. 2 is a schematic diagram of a second prior art branch decision circuit.

A second prior art branch decision circuit 40 is schematically illustrated in FIG. 2. The gates are chosen in this prior art branch decision circuit 40 to be consistent with a CMOS (complementary metal oxide semiconductor) implementation. Gating of the appropriate branch conditions alu-zero, alu-negative, alu-overflow, and alu-carryout is accomplished by EN<3:0> in cooperation with NAND gates 42,43,44,45 as depicted in FIG. 2. EXNOR gate 46, 3 input NAND gate 47, and EXOR gate 48 cooperate to produce a branch decision signal JTAKEN as depicted in FIG. 2. The circuit's functional description is identical to that described in the equation above.

Figure 3:
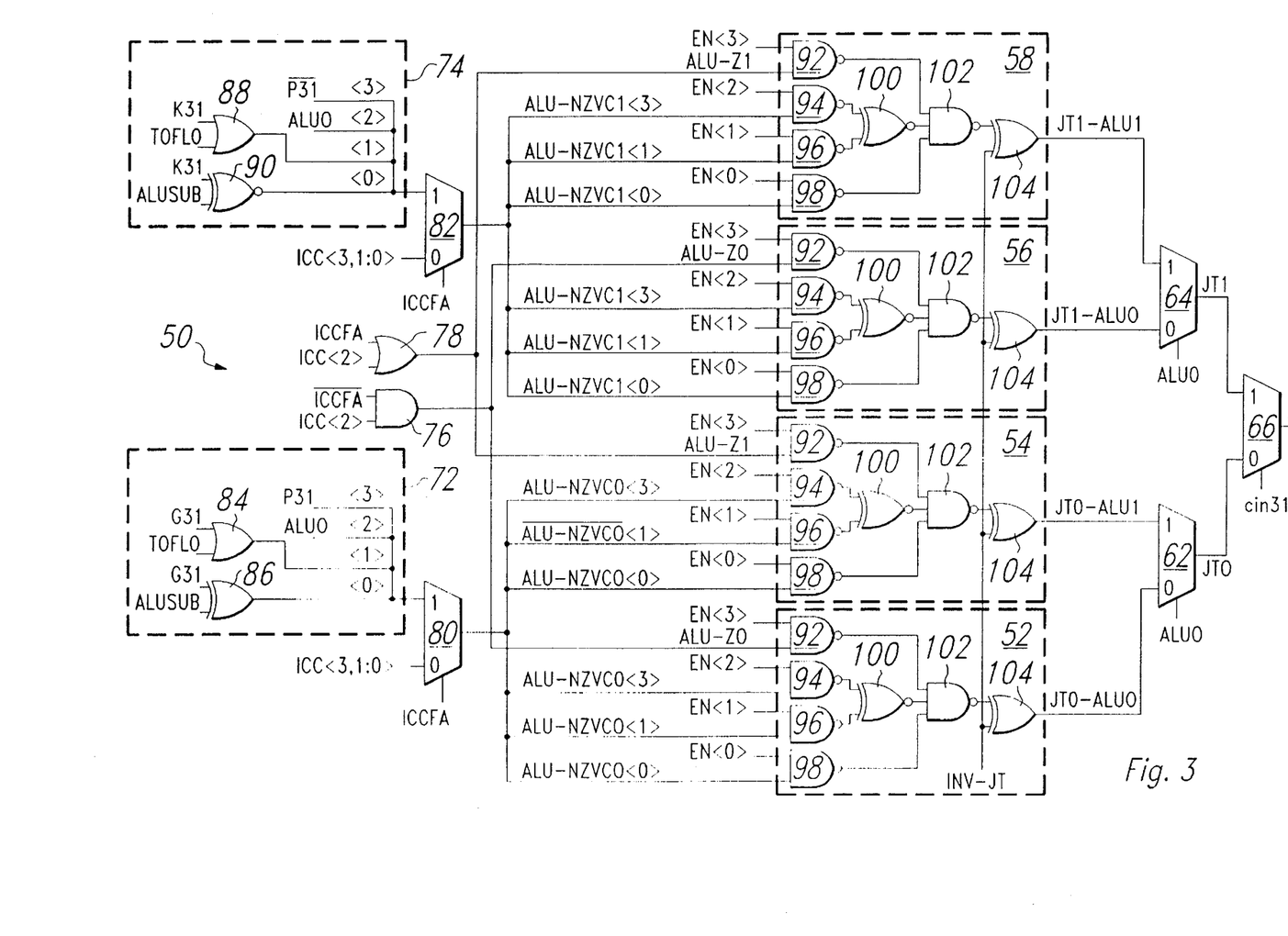
FIG. 3 is a schematic diagram of a first preferred embodiment branch decision circuit optimized for cin31 being the latest-arriving condition code.
Figure 10:
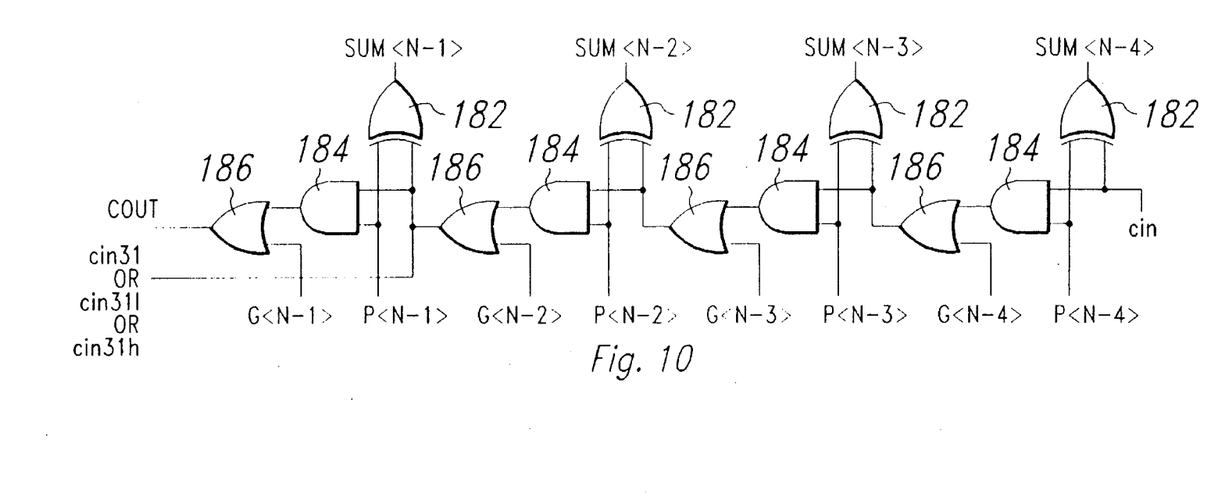
FIG. 10 is a partial schematic of an N-bit ripple carry adder such as could be used as for the partial sum adders shown as blocks in FIG. 9.

A first preferred embodiment branch decision circuit 50 is schematically illustrated in FIG. 3. This branch decision circuit assumes late-arriving status signals consistent with an adder/ALU in which the ALU=0 signal, or ALU0, and the carry-in signal, cin31, to the MSB are assumed to be the late-arriving signals. A circuit from which the ALU=0 signal may be derived is shown generally in FIGS. 14a–14b, although many other ALU=0 circuits could be advantageously applied to the invention described herein. A circuit from which cin31 may be determined is shown in FIG. 10. The signal names and numbers of late-arriving signals are merely exemplary. This first preferred embodiment branch decision circuit 50 may be advantageously applied to many adders and ALU architectures including, but not limited to: carry-lookahead adder/ALUs, carry-select adder/ALUs, conditional sum adder/ALUs, and ripple carry adder/ALUs all with varying late-arriving status signals.

In accordance with FIG. 3, the preferred embodiment of the present invention makes use of the fact that the branch decision result can be expressed as a function of cin31 and ALU0. Since these signals typically arrive late, four copies of the branch circuitry 52,54,56,58 are included. Each copy of the branch circuit assumes a different combination of values for cin31 and ALU0. Since these assumed values are constants they do not contribute to the delay. After all four candidate branch decision circuits 52,54,56,58 have output their results, muxes 62,64,66 choose the correct result from among the candidate branch decision circuits 52,54,56,58 using the actual values of cin31 and ALU0 as the select controls. Having cin31 and ALU0 produce the branch decision after only one or two mux delays allows the branch decision to be resolved much earlier than in the prior art. The reason that the branch decision is expressed as a function of cin31 is that the alu-overflow, alu-negative, and alu-carryout condition codes are easily computed once a value for cin31 is assumed.

With further reference to FIG. 3 the candidate condition codes vary among the candidate branch decision circuits 52,54,56,58. With the exception of the alu-zero branch condition the candidate condition codes are named ALU-NZVCx (where x is 0 or 1 according to whether a 0 or 1 candidate value is assumed for cin31). The alu-zero candidate condition code is named ALU-Zy (where y is either 0 or 1 according to whether a 0 or 1 candidate value is assumed for ALU=0). The derivation of these candidate condition codes will be later described. The correspondence of the ALU condition codes alu-negative, alu-zero, alu-overflow, and alu-carry of the candidate branch decision circuits 52,54,56,58 and their associated enable signals EN<3:0> with the candidate condition codes is shown below in Table 1:

TABLE 2

| conditions: cin31,ALU0 => | 0,0 | 0,1 | 1,0 | 1,1 |
|---|---|---|---|---|
| candidate branch decision signal | JT0-ALU0 | JT0-ALU1 | JT1-ALU0 | JT1-ALU1 |
| candidate branch decision circuit | first circuit 52 | second circuit 54 | third circuit 56 | fourth circuit 58 |

With further reference to FIG. 3, generally, the preferred embodiment circuit 50 selects from the four candidate branch decision signals JT0-ALU0, JT0-ALU1, JT1-ALU0, and JT1-ALU1 by candidate branch decision signal selection muxes 62,64,66. The four candidate branch decisions are resolved to two candidates JT0, JT1 by candidate branch muxes 62,64 which receive as their select inputs ALU0. A negatively asserted condition of ALU=0 (ALU0=0) selects JT0-ALU0 as the signal which candidate branch mux 62 will output as JT0 and selects JT1-ALU0 as the signal which candidate branch mux 64 will output as JT1. A positively asserted condition of ALU=0 (ALU0=1) selects JT0-ALU1 as the signal which candidate branch mux 62 will output as JT0, and selects JT1-ALU 1 as the signal which candidate branch mux 64 will output as JT1. These two candidates JT0, JT1 are resolved into a single branch decision signal JT by selection mux 66 which receives as its select input cin31. A negatively asserted condition of cin31 (cin31=0) selects JT0 to be selected to continue as JT. A positively asserted condition of cin31 (cin31=1) selects JT1 to be selected to continue as JT. In this manner, branch decision signal JT may become valid within a gate delay from receipt of late arriving signal cin31 and within two gate delays from receipt of late-arriving signal ALU=0. Preferably late-arriving signal ALU=0 is valid previous to, or coincident with, the ALU sum output becoming valid in order to gain maximum reduction in delay to a valid branch decision signal JT. An exemplary circuit to accomplish an accelerated computation of the ALU=0 signal is disclosed in U.S. patent application

| ALU condition/enable signal => ⇓ candidate branch decision ckt | alu-zero/ EN<3> | alu-neg/ EN<2> | alu-overflow/ EN<1> | alu-carryout/ EN<0> |
|---|---|---|---|---|
| first branch decision circuit 52 | ALU-Z0 | ALU-NZVC0<3> | ALU-NZVC0<1> | ALU-NZVC0<0> |
| second branch decision circuit 54 | ALU-Z1 | ALU-NZVC0<3> | ALU-NZVC0<1> | ALU-NZVC0<0> |
| third branch decision circuit 56 | ALU-Z0 | ALU-NZVC1<3> | ALU-NZVC1<1> | ALU-NZVC1<0> |
| fourth branch decision circuit 58 | ALU-Z1 | ALU-NZVC1<3> | ALU-NZVC1<1> | ALU-NZVC1<0> |

Figure 14A:
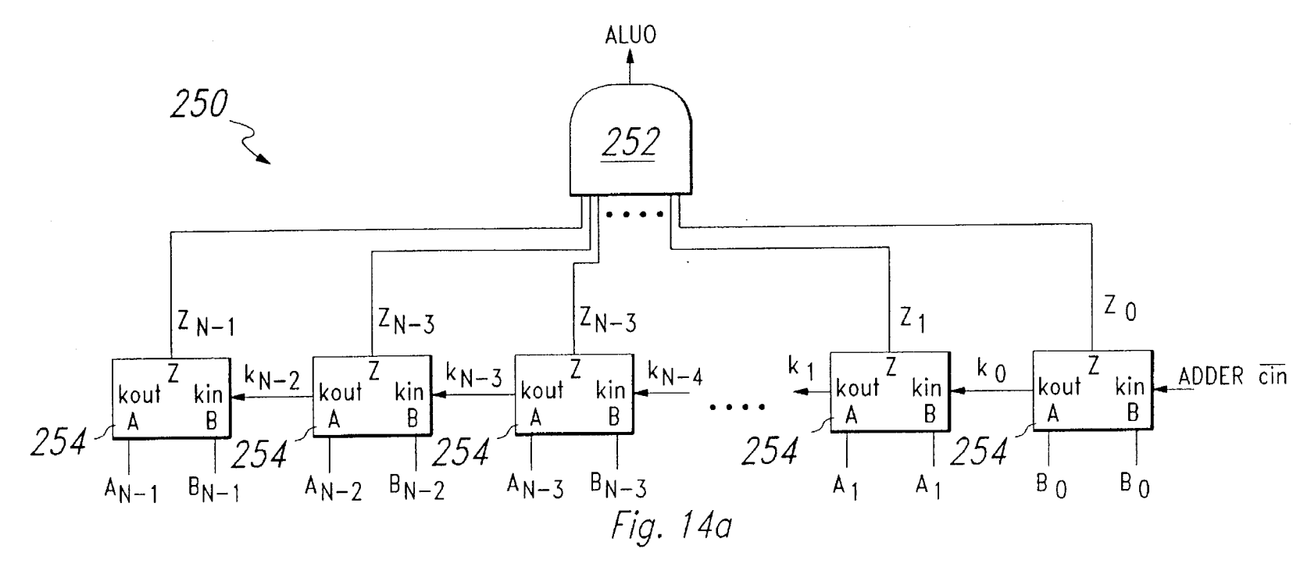
FIGS. 14a–14b illustrate an ALU=0 circuit having one-bit zero cells.
Figure 14B:
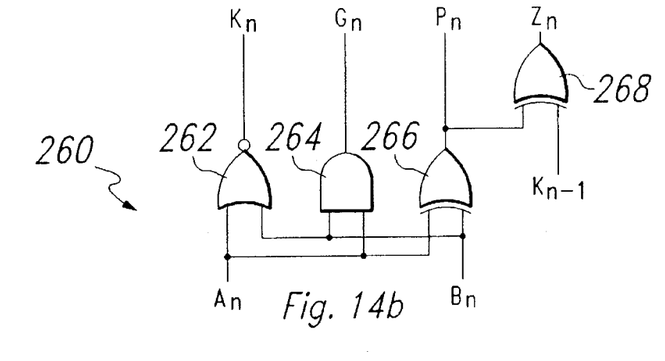

Each candidate branch decision circuit 52,54,56,58 generates a candidate branch decision. First candidate branch decision circuit 52 generates JT0-ALU0 assuming cin31=0 and ALU0=0 as shown in FIG. 3 and tabulated in Table 2. Second candidate branch decision circuit 54 generates JT0-ALU1 assuming cin31=0 and ALU0=1 as shown in FIG. 3 and tabulated in Table 2. Third candidate branch decision circuit 56 generates JT1-ALU0 assuming cin31=1 and ALU0=0 as shown in FIG. 3 and tabulated in Table 2. Finally, fourth candidate branch decision circuit 58 generates JT1-ALU1 assuming cin31=1 and ALU0=1 as shown in FIG. 3 and tabulated in Table 2. The correspondence of the candidate branch decisions signals and candidate branch decision circuits 52,54,56,58 with the candidate conditions of cin31 and ALU0 are shown below in Table 2:

Ser. No. 922,926 by Bosshart, et al. and is schematically illustrated in FIGS. 14a–14b. Although cin31 and ALU0 have been assumed to be the late-arriving signals upon which the branch decision signals have been conditionalized, the preferred embodiment of the present invention can be easily incorporated to conditionalize upon other or additional late-arriving signals.

Still referring to FIG. 3, derivation of the candidate condition codes will now be described. As mentioned above, the candidate condition codes are ALU-NZVCx<3:0> and ALU-Zy. In the preferred embodiment, because the branch decisions are conditionalized upon ALU-0, the candidate condition codes ALU-NZVCx<2> which would otherwise represent the alu-zero candidate condition codes are not used. Instead the alu-zero condition is represented by the candidate condition codes ALU-Zy. If in an alternative embodiment, however, the branch decision was conditionalized only upon cin31, ALU-NZVC0<3:0> and ALU-NZVC1<3:0> would constitute a complete set of candidate condition codes. The condition codes for alu-negative, alu-overflow, and alu-carry, their corresponding (correspondence as shown above in Table 1) candidate condition codes may be selected from a condition code register 70 (not shown, see FIG. 4) whose outputs are ICC<3, 1:0>, or directly from the condition code logic circuits 72,74 whose operation is described below. This choice is typical of pipelined architectures in which ALU operations typically set the condition code, and later branch instructions may use the condition code at any time. When an ALU operation modifies the condition code immediately before a branch instruction using that condition code, in typical pipelined implementations the ALU actually produces the condition code in the same clock cycle as the subsequent branch instruction is executed. If the condition code was instead last set by an earlier instruction (with subsequent instructions therebetween), the condition code for the subsequent branch decision has to be taken from a condition code register 70. As a result the branch decision circuit 50 has to choose to either use the signals from condition code logic circuits 72,74 or the status signals stored in the condition code register 76, ICC<3, 1:0>. This choice is typically made using condition code selection muxes 80,82 with a selection signal icc-from-alu or ICCFA. ICCFA will select candidate condition codes from the condition code register 70 if negatively asserted and from condition code logic circuits 72,74 if positively asserted. Circuitry for the condition code register 70 and ICC<3, 1:0> are subsequently discussed in further detail herein and shown in FIG. 4. In the instance that data from the condition code register 70 is selected by ICCFA=0 then identical signals will be passed through the candidate branch decision circuits 52,54,56,58 and the circuitry to select the appropriate candidate branch decision will be of no import as all branch decisions will be identical.

With continued reference to FIG. 3, operation of condition code logic circuits 72,74 and the condition codes derived therefrom will now be described. The condition code logic circuit 76,78 and their condition codes will be described later. First condition code logic circuit 72 generates candidate condition codes for an assumed cin31 of 0 and positively asserted ICCFA as mentioned above. The logic for these candidate signals in the case of an add operation are shown below in Table 3. The extension or modification of this logic for a subtract operation is obvious to one of ordinary skill in the art of design of computer architectures.

TABLE 3

LOGIC FOR CANDIDATE CONDITION CARRY-IN=0

| ⇓ condition | select signal condition → ⇓ candidate condition code | ICCFA=0 | ICCFA=1 |
|---|---|---|---|
| Negative | ALU-NZVC0<3> | ICC<3> | p31 |
| Overflow | ALU-NZVC0<1> | ICC<1> | g31+TOFLO |
| Carryout | ALU-NZVC0<0> | ICC<0> | g31⊕ALUSUB |

The logic used to derive the logic shown in Table 3 for ICCFA=1 is shown in FIG. 3.

n=3 bit: ALU-NZVC0<3> is the candidate alu-negative signal, assuming cin31=0. This signal is input into the n=3 bit of the positively asserted input of the first condition code selection mux 80. Alu-negative is equal to SUM<31>, the MSB sum output of the adder. It is equal to the propagate signal of bit 31 of the ALU, called p31, since the output signal is equal to the propagate signal if the carry-in is zero. p31 feeds directly into the fourth (n=3) bit of the positively asserted input of the first condition code selection mux 80.

n=1 bit: ALU-NZVC0<1> is the candidate alu-overflow signal, assuming cin31=0. This signal is input into the n=1 bit of the positively asserted input of the first condition code selection mux 80 from an OR gate 84 which performs a logical OR of g31 and TOFLO. The OR function is required to factor in the "SPARC" architecture-specific type-checking overflow TOFLO condition, and is not related to the ALU MSB overflow. Arithmetic or ALU MSB overflow is defined to be true when the MSB of the sum output does not properly represent the sign of the result. In other words, if both inputs were sign-extended one bit and the ALU were one bit wider, this new higher MSB would differ from the current MSB. Since both a and b inputs are the same to these two bits, their results both differ if their carry-ins differ, or if the carryout of bit 31 does not equal the carry-in. For ALU-NZVC0 with an assumed cin31=0, overflow will be true when carryout is true. Carry-out will be true only when g31 is true.

n=0 bit: ALU-NZVC0<0> is the candidate alu-carryout signal, assuming cin31=0. This signal is input into the n=0 bit of the positively asserted input of the first condition code selection mux 80 from an EXOR gate 86 which performs a logical EXOR of g31 and ALUSUB. Assuming cin31=0, the ALU carry-out signal will be true if g31=1. As noted above, the "SPARC" architecture reverses the polarity of carry-out for subtracts necessitating the EXOR function of NZVC0<0> with ALUSUB. The signals g31 and p31 used above are the generate and propagate signals for the MSB (in this embodiment the thirty-first bit) of the adder/ALU. These propagate and generate are well known in the art of adder/ALU design. Their definitions for an add operation are described as follows where a<31> and b<31> are the 31st bit of the first and second operands, respectively:

$$p31 (\text{or } p<31>) = a<31> \oplus b<31>,$$

$$g31 (\text{or } g<31>) = a<31> \cdot b<31>.$$

The above described candidate condition codes NZVC0<3>, NZVC0<1> and NZVC0<0> are received by the candidate branch decision circuits 52,54 for which value of 0 for cin31 is assumed.

Second condition code logic circuit 74 generates candidate condition codes for an assumed carry-in to the MSB of the ALU (cin31) of 1 and positively asserted ICCFA as mentioned above. The logic for these candidate signals are shown below in Table 4. The extension or modification of this logic for a subtract operation is obvious to one of ordinary skill in the art of design of computer architectures.

TABLE 4

LOGIC FOR CANDIDATE CONDITION CARRY-IN=0

| ⇓ condition | select signal condition → ⇓ candidate condition code | ICCFA=0 | ICCFA=1 |
|---|---|---|---|
| Negative | ALU-NZVC1<3> | ICC<3> | p31_ |
| Overflow | ALU-NZVC1<1> | ICC<1> | k31+TOFLO |
| Carryout | ALU-NZVC1<0> | ICC<0> | k31⊕ALUSUB |

The logic for input to the positively asserted inputs (ICCFA=1) of a second condition code selection mux 82, which has as its select input ICCFA, is described below and is shown in FIG. 3:

n=3 bit: p31_ (where the trailing "_" indicates a negative logic signal as indicated by an overline in FIG. 3) feeds directly into the fourth (n=3) bit of the positively asserted input of the second condition code selection mux 82. The reasoning behind p31_ representing the alu-negative condition is as follows: The sign of the MSB is equal to the MSB sum as is well known in the art. The one bit sum is equal to p<31>⊕cin31. Since cin31=1 (candidate value for cin31), then p<31>⊕cin31 is merely equal to p31_.

n=1 bit: this input into the second (n=1) bit of the positively asserted input of the second condition code selection mux 82 is received from an OR gate 88 which performs a logical OR of k31 and TOFLO. As with the n=1 bit of ALU-NZVC0 an OR gate 88 is required to perform a logical OR between the arithmetic overflow and the tag-overflow, TOFLO. As discussed with ALU-NZVC0, ALU MSB overflow is defined to be true when the carryout of bit 31 does not equal the carry-in. For ALU-NZVC1 with an assumed cin31=1, overflow will be true when the kill signal, k31, is true.

n=0 bit: ALU-NZVC1<0> is the candidate alu-carryout signal, assuming cin31=1. This signal is input into the first (n=0) bit of the positively asserted input of the second condition code selection mux 82. An EXNOR gate 90 generates this signal as a logical EXNOR of k31 and ALUSUB. The ALU carry-out signal will be true if g31=1 or p31=1. These combined conditions are identical to k31=0. As noted above, the "SPARC" architecture reverses the polarity of carry-out for subtracts necessitating the EXNOR function with ALUSUB.

The signals k31 and p31 used above are the kill and propagate signals for the thirty-first bit of the adder/ALU. These signals are typically present within existing adder/ALU circuits, and circuitry for generating these signals will not be included herein. These propagate and kill signals and means for generating them are well known in the art of adder/ALU design. Their definitions for an add operation are described as follows where a<31> and b<31> are the 31st bit of the first and second operands, respectively:

$$p31(\text{or } p<31>) = a<31> \oplus b<31>,$$
$$k31(\text{or } k<31>) = a<31> + b<31>.$$

The above described candidate condition codes NZVC1<3>, NZVC1<1> and NZVC1<0> are received by the candidate branch decision circuits 56,58 for which a value of 1 for cin31 is assumed.

With further reference to FIG. 3, the derivation of the signals ALU-Z0 and ALU-Z1 generated by gates 76 and 78 respectively will now be described. The preferred embodiment of the present invention conditionalizes upon ALU=0 by having candidate branch decision circuits 52,56 where the value of ALU=0 is assumed to be negatively asserted and candidate branch decision circuits 54,58 where the value of ALU=0 or ALU0 is assumed to be positively asserted (i.e. ALU0=1 or the result of the ALU computation is zero). In prior art circuits the branch decision circuit 30,40 is not conditionalized upon late arriving ALU=0 signal. The alu-zero condition code would then be selected from the n=2 bit of the condition code register 70 and the ALU=0 signal from the ALU based on the condition of ICCFA. The prior art mux selection logic is as follows:

$$alu\text{-}zero = ICCFA.ALU0 + \overline{ICCFA}.ICC<2>$$

The candidate conditional codes ALU-Z0 and ALU-Z1 are conditionalized from the above equation by setting ALU0 to be 0 or 1, respectively. These equations are shown below:

$$\begin{aligned} ALU-Z0 &= ICCFA \cdot 0 + \overline{ICCFA} \cdot ICC<2> \\ &= \overline{ICCFA} \cdot ICC<2> \end{aligned}$$

$$\begin{aligned} ALU-Z1 &= ICCFA \cdot 1 + \overline{ICCFA} \cdot ICC<2> \\ &= ICCFA + \overline{ICCFA} \cdot ICC<2> \\ &= ICCFA + ICC<2> \end{aligned}$$

Generation of the signal ALU-Z0 is accomplished by third condition code logic circuit 76 from which the output signal ALU-Z0 is sent to first and third candidate branch decision circuits 52,56. This third condition code logic circuit 76 is typically an AND gate as shown in FIG. 3. Generation of the signal ALU-Z1 is accomplished by a fourth condition code logic circuit 78 from which the output signal ALU-Z1 is sent to second and fourth candidate branch decision circuits 54,58. This fourth condition code logic circuit 78 is typically an OR gate as shown in FIG. 3.

With further reference to FIG. 3, NAND gates 92,94,96, 98 of candidate branch decision circuits 52,54,56,58 receive candidate condition codes gated with enable signals EN<3:0> as previously discussed. EXNOR 100 receives the gated candidate condition codes from NAND gates 94,96. Three-input NAND gate 102 in turn receives the output of EXNOR 100 and NAND gates 92,98 to produce a candidate branch decision signal JTx-ALUy' where x,y are the candidate conditions for cin31 and ALU0 as described in Table 2. The logic description for JTx-ALUy' is described in terms of the candidate condition codes and enable signals as follows:

$$JTx\text{-}ALUy' = EN<3>.ALU\text{-}Zy + (EN<2>.ALU\text{-}NZVCX<3> \oplus EN<1>.ALU\text{-}NZVCX<1>) + EN<0>.ALU\text{-}NZVCX<0>)$$

The candidate branch decision JTx-ALUy' may be inverted by a two-input EXOR gate 104 which receives the output of NAND gate 102 and the signal INV-JT. INV-JT serves to invert the candidate branch decision as follows by definition of the EXOR function: if INV-JT is negatively-asserted (INV-JT=0), then a negatively-asserted output of NAND gate 102 will generate a negatively-asserted candidate branch decision and positively-asserted output of NAND gate 102 will generate a positively-asserted candidate branch decision; if INV-JT is positively-asserted (INV-JT=1), then a negatively-asserted output of NAND gate 102 will generate a positively-asserted candidate branch decision and a positively-asserted output of NAND gate 102 will generate a negatively-asserted candidate branch decision. The final output after the EXOR 104 is JTx-ALUy, where x,y is 0,0 or 0,1 or 1,0 or 1,1 depending on the candidate conditions as described above.

As previously mentioned, the preferred embodiment circuit 50 selects from the four candidate branch decision signals JT0-ALU0, JT0-ALU1, JT1-ALU0, and JT1-ALU1 by candidate branch decision signal selection muxes 62,64, 66. The mux arrangement shown in FIG. 3 is consistent with the signals typical for a ripple carry adder, a carry-lookahead adder, a conditional sum adder, or others. The arrangement can be readily modified by one skilled in the art for use with other adders. The adders listed also might have slightly varying architectures to which the invention might be modified in an obvious fashion in order to be compatible therewith. Modifications are shown hereinbelow to illustrate different possible embodiments. Various modifications and combinations of the illustrative embodiments, as well as other embodiments of the invention, will be apparent to persons skilled in the art upon reference to the description. It is therefore intended that the appended claims encompass any such modifications or embodiments.

Figure 4:
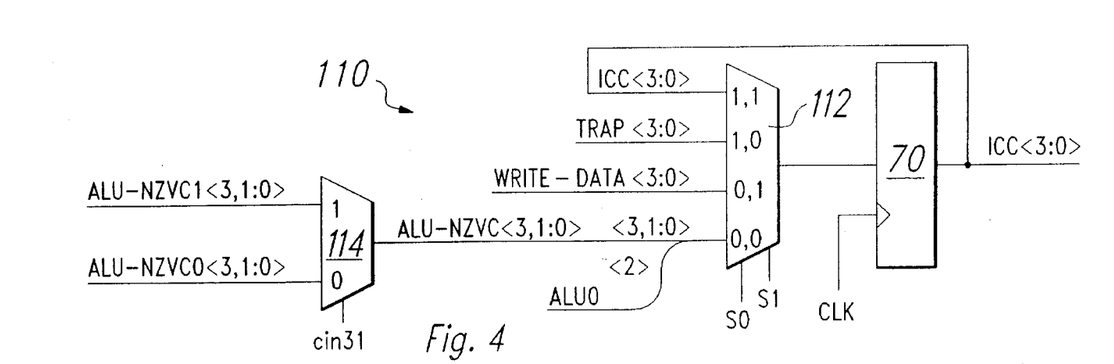
FIG. 4 is a preferred embodiment schematic diagram of the condition code register and associated circuitry.

Referring now to FIG. 4, a preferred embodiment schematic diagram of the condition code register 70 and associated circuitry 110 is depicted. In this particular implementation a four bit by four-to-one mux 112 is operable by select inputs S0,S1 to select data to be loaded into the condition code register 70 from one of four condition code sources. Preferably S0 and S1 are provided by an associated processor. In this instance if S0,S1=0,0 then the condition code register 70 will receive three bits of data from a three bit by two-to-one mux 114 and a fourth bit from the ALU0 signal. This mux 114 selects between candidate branch decision signals ALU-NZVC0<3, 1:0> and ALU-NZVC1<3, 1:0> by the condition of cin31 to generate signals ALU-NZVC<3, 1:0>. Alternatively, if S0,S1=0,1 then mux 112 selects WRITE-DATA<3:0> as the data to pass through to condition code register 70. WRITE-DATA<3:0> might be data which is written to the condition code register 70 directly from the ALU. If S0,S1=1,0 then mux 112 selects TRAP<3:0> as the data to pass through to condition code register 70. Finally, if S0,S1=1,1 then the value of the condition code register 70 output ICC<3:0> is input again into the condition code register 70 thereby maintaining constant data within the condition code register. The signals and circuitry described with reference to FIG. 4 are merely exemplary to show how the condition code register might operate to select among differing groups of condition codes. The advantage of this functionality will be readily apparent to one of ordinary skill in the art, as will the apparent use of TRAP<3:0>, WRITE-DATA<3:0>, and the other groups of condition codes.

Figure 5A:
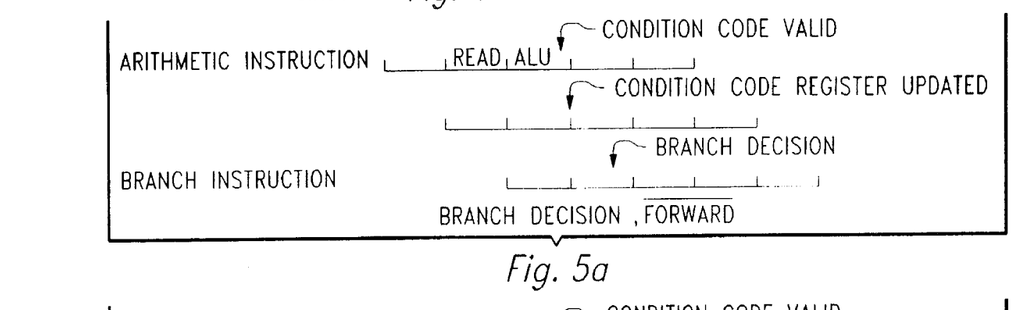
FIGS. 5a–5b are timing diagrams of the condition code register and associated circuitry with and without forwarding.
Figure 5B:
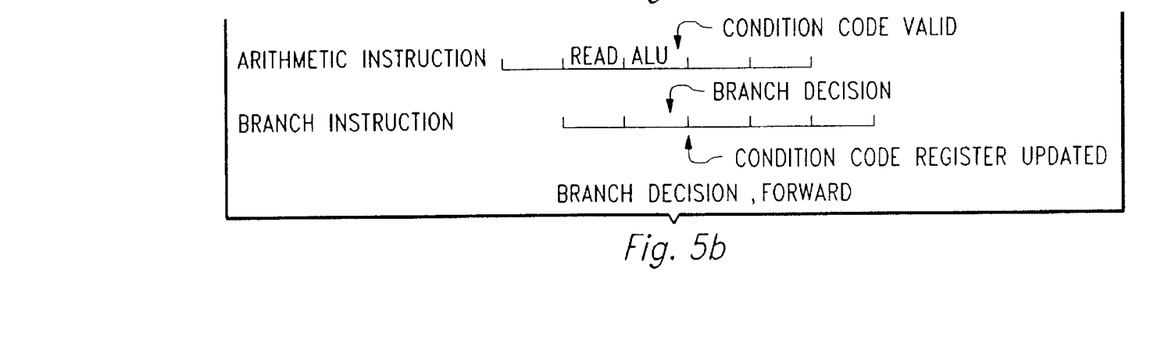

Referring to FIG. 3 in conjunction with FIGS. 5a–5b, muxes 80,82 and gates 76,78 are provided to allow condition code forwarding. The operation of this condition code forwarding circuitry 76,78,80,82 and condition code logic circuitry 72,74 can be best understood by examining the timing diagram of FIGS. 5a–5b with relation to FIG. 3. FIGS. 5a–5b shows several clock cycles of a pipelined architecture. Sequential instructions shown in FIGS. 5a–5b as vertically displaced from each other have their execution overlapped in the pipelined architecture. FIGS. 5a–5b show an arithmetic operation with and without forwarding. In a pipelined architecture if the instruction immediately before a branch decision modifies the condition code, then the ALU produces the condition code in the same clock cycle in which the subsequent branch instruction makes the branch decision. As such, ICCFA will be positively asserted and the condition code forwarding circuits 76,78,80,82 will select the current codes directly and not from the condition code register 70. For the case of ICCFA=0, the condition code is instead set by an earlier instruction and latched condition codes for the branch decision must therefore be read from the condition code register 70. This choice can be made using two-to-one forwarding muxes 80,82 and gates 76,78 controlled by ICCFA. In the instance that data from the condition code register 70 is selected by ICCFA=0 then identical signals will be passed through the candidate branch decision circuits 52,54,56,58 and the circuitry to select the appropriate candidate branch decision will be of no import as all branch decisions will be identical.

Figure 6A:
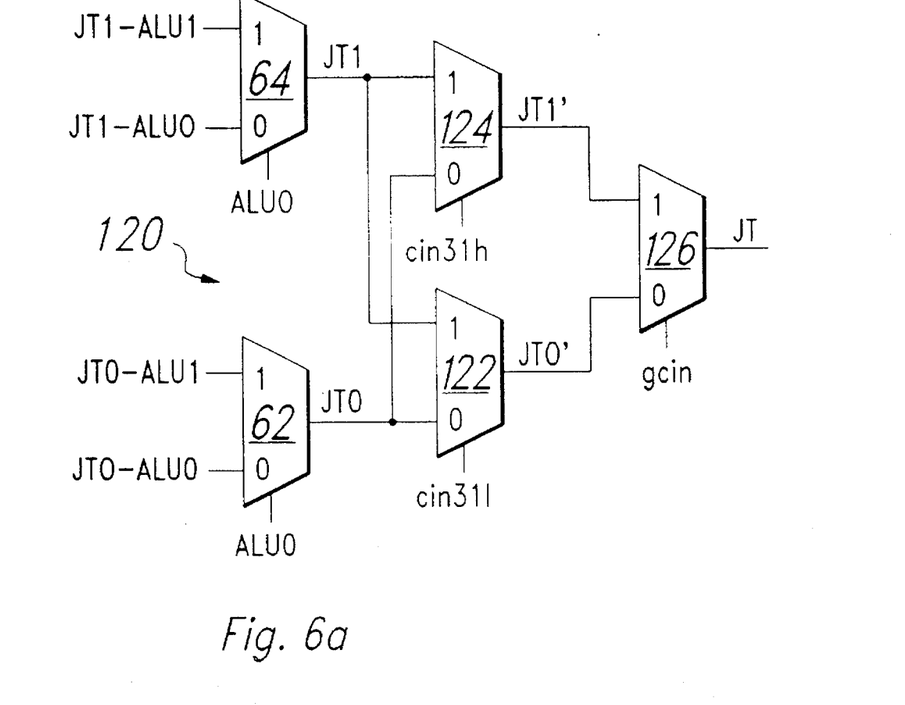
FIG. 6a is a partial schematic diagram showing a first implementation of candidate branch decision signal selection muxes of a second preferred embodiment branch decision circuit whose structure is consistent with a carry-select adder/ALU optimized for gcin being the latest-arriving condition code.

FIG. 6a shows a partial schematic diagram of a first implementation 120 of a second preferred embodiment branch decision circuit. The structure of this embodiment is consistent with a carry-select adder such as the one shown in FIG. 9. Candidate branch decision signal selection muxes 62,64 resolve the candidate branch decision signals JTx-ALUy on the basis of ALU0. Specifically, the four candidate branch decisions are resolved to two intermediate candidate branch decisions JT0, JT1 by candidate branch muxes 62,64 in the same manner described for first preferred embodiment branch decision circuit 50. However, the second preferred embodiment circuit must further resolve these intermediate candidate branch decision signals JT0, JT1 by cin31l and cin31h and in turn by gcin. This first implementation 120 shown in FIG. 6a selects one of JT0 and JT1 to continue in yet another level of intermediacy as JT0' by use of mux 122 whose select input is cin31l and selects one of JT0 and JT1 to so continue as JT1' by use of mux 124 whose select input is cin31h. JT is then selected from JT0' and JT1' by mux 126 whose select input is gcin.

Figure 6B:
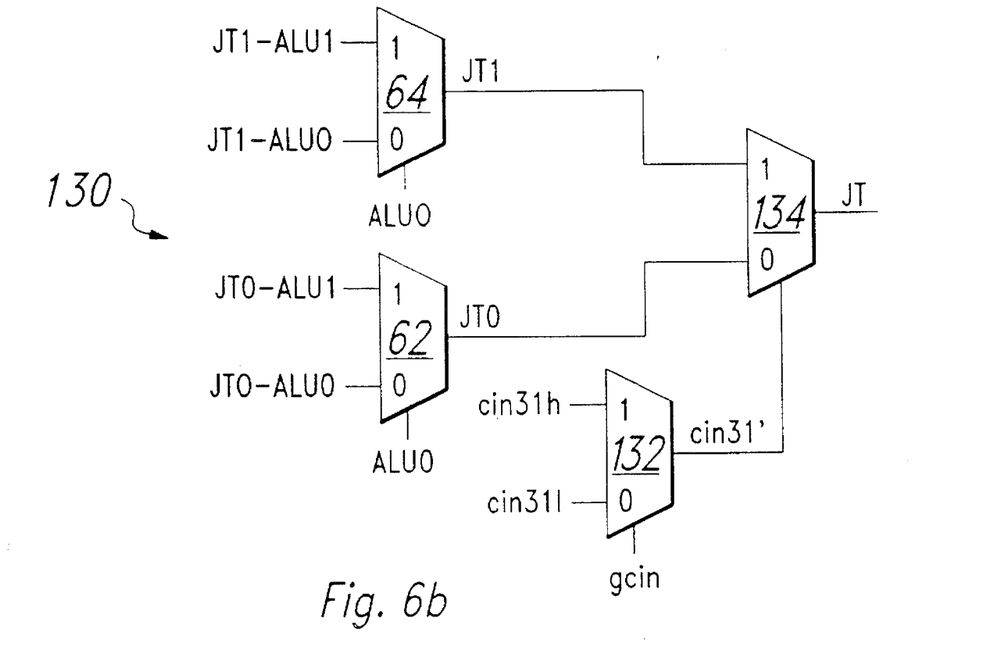
FIG. 6b is a partial schematic diagram showing a second implementation of candidate branch decision signal selection muxes of a second preferred embodiment branch decision circuit whose structure is consistent with a carry-select adder/ALU optimized for gcin being the latest-arriving condition code.

The second implementation 130 of the second preferred embodiment is shown in FIG. 6b. As in the first implementation 120, candidate branch decision signal selection muxes 62,64 resolve the candidate branch decision signals JTx-ALUy on the basis of ALU0. Specifically, the four candidate branch decisions are resolved to two intermediate candidate branch decision signals JT0, JT1 by candidate branch muxes 62,64 in the same manner described for first preferred embodiment branch decision circuit 50. A mux 134 then selects between intermediates JT0 and JT1 on the basis of cin31' and outputs a branch decision signal JT. The structure of this embodiment is also consistent with a carry-select adder such as the one shown in FIG. 9. The second implementation of the second preferred embodiment provides for different signal path delays relative to the first implementation and could be used advantageously depending on the signal delays of the adder with which it is used.

Figure 7:
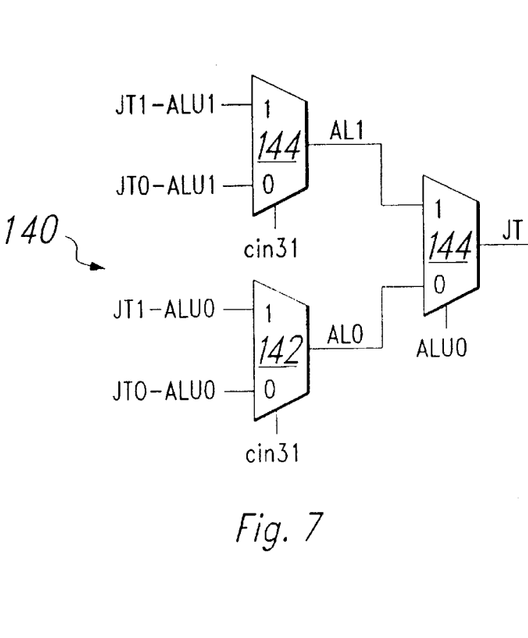
FIG. 7 is a partial schematic diagram showing an implementation of the candidate branch decision signal selection muxes of a third preferred embodiment branch decision circuit whose structure is consistent with an adder/ALU optimized for ALU0 being the latest-arriving condition code.

In FIG. 7, a partial schematic diagram of third preferred embodiment branch decision circuit 140 is illustrated. The structure of this embodiment is consistent with a carry-ripple adder, a carry-lookahead adder, a conditional sum adder or another adder/ALU optimized for ALU0 being the latest-arriving condition code. This embodiment uses a mux 142 to resolve JT0-ALU0 and JT1-ALU0 into intermediate branch decision signal AL0 using cin31 as the select input and a mux 144 to so resolve JT0-ALU1 and JT1-ALU1 into AL1 using cin31 as the select input. AL0 and AL1 are then resolved by mux 146 into the branch decision signal, JT, using ALU0 as the select input to mux 146.

Figure 8:
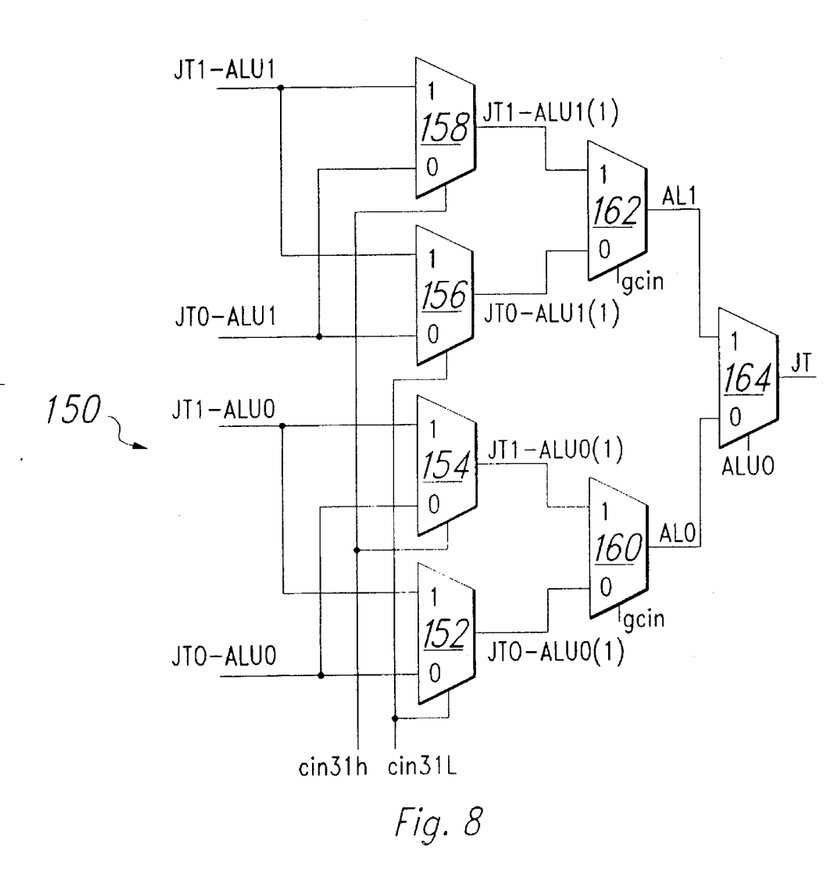
FIG. 8 is a partial schematic diagram showing an implementation of the candidate branch decision signal selection muxes of a fourth preferred embodiment branch decision circuit whose structure is consistent with a carry-select adder/ALU optimized for ALU0 being the latest-arriving condition code.

FIG. 8 illustrates a partial schematic diagram of a fourth preferred embodiment branch decision circuit 150. The structure of this embodiment is consistent with a carry-select adder/ALU optimized for ALU0 being the latest-arriving condition code. This embodiment uses a mux 152 to resolve JT0-ALU0 and JT1-ALU0 into JT0-ALU0(I) using cin31l as the select input and a mux 154 to resolve JT0-ALU0 and JT1-ALU0 into JT1-ALU0(I) using cin31h as the select input. This embodiment further uses a mux 156 to resolve JT0-ALU1 and JT1-ALU1 into JT0-ALUI(I) using cin31l as the select input and a mux 158 to resolve JT0-ALU1 and JT1-ALU1 into JT1-ALU1(I) using cin31h as the select input. A mux 160 then resolves JT0-ALU0(I) and JT1-ALU0(I) into AL0 using gcin as a select input and mux 162 resolves JT0-ALU1(I) and JT1-ALU1(I) into AL1 using gcin as a select input. Finally, a mux 164 resolves AL0 and AL1 into the branch decision signal, JT, using ALU0 as the select input to mux 164.

Figure 9:
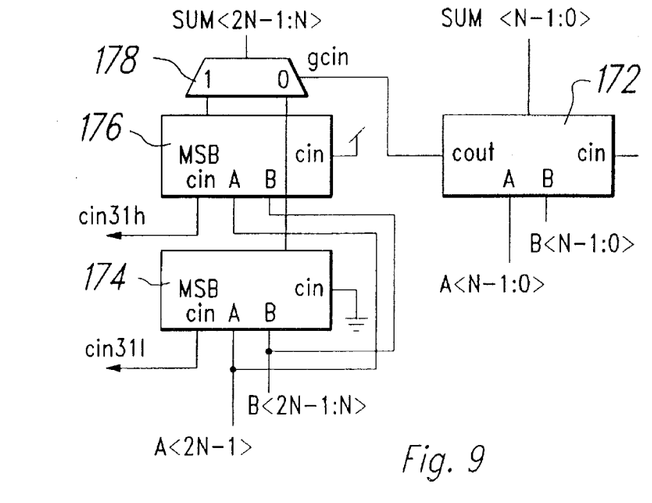
FIG. 9 is a high-level schematic diagram of a carry-select adder comprising N-bit partial sum adders with MSB carry-in signals made available for branch decision signal selection.

In FIG. 9, a carry-select adder 170 comprising N-bit partial sum adders 172,174,176 with MSB carry-in signals cin31l and cin31h made available for branch decision signal selection is schematically illustrated. In this particular schematic, a 2N-bit sum is accomplished by using an N-bit partial sum adder 172 for SUM<N−1:0>. A mux 178 then selects SUM<2N−1:N> from between an N-bit adder 174 whose carry-in was assumed to be 0 and an N-bit adder 176 whose carry-in was assumed to be 1. The selection between these two adders 174,176 is by the carry-out, gcin, from the partial sum adder 172. Adder 174 provides an output, cin31l, from the carry-in to its MSB and adder 176 provides an output, cin31h, from the carry-in to its MSB. Cin31l, cin31h, and gcin are the signals which were used for mux selection in second and fourth preferred embodiment branch decision circuits illustrated in FIGS. 6a–6b and 8.

FIG. 10 illustrates a partial schematic of an N-bit ripple carry adder 180 such as could be used for the partial sum adders 172,174,176 shown as blocks in FIG. 9. These adders could also be the adder circuitry for the first preferred embodiment as illustrated in FIG. 3. In such instance, N might be equal to 32 where 32 was the number of bits of the entire adder/ALU. As such the cin31 signal shown in FIG. 10 would be the MSB carry-in late-arriving status signal.

Figure 11:
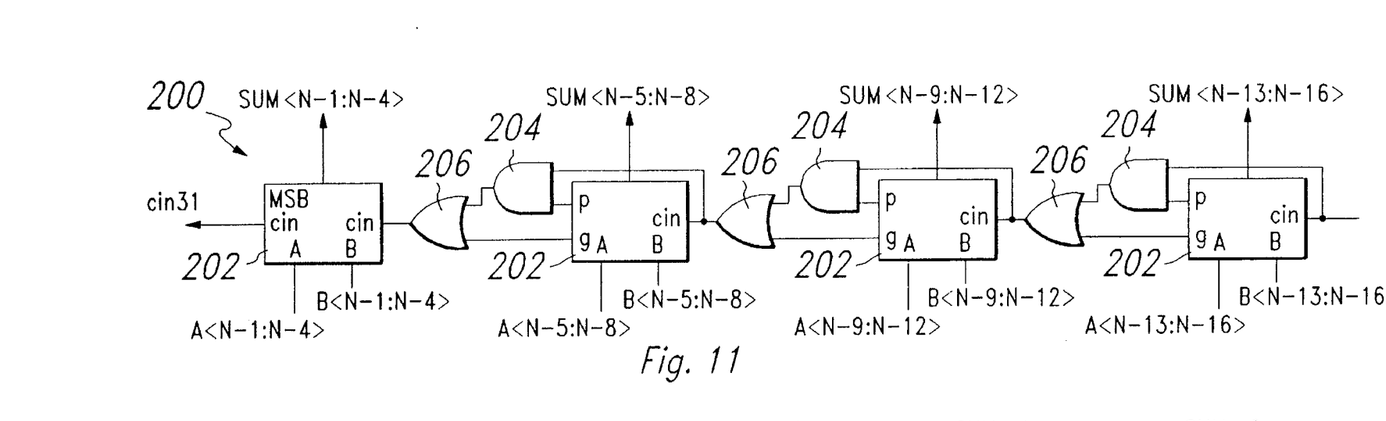
FIG. 11 is a high-level schematic diagram of a carry-lookahead adder comprising N-bit partial sum adders with the MSB carry-in signal made available for branch decision signal selection.

FIG. 11 schematically illustrates an N-bit carry-lookahead adder 200. This adder utilizes carry-lookahead adder cells 202 which receive a group carry-in computed by AND-OR gate 204–206. AND-OR gate 204–206 computes the carry-in from group propagate, p, and group generate, g, signals from a less significant adder cell 202. The most significant adder cell 202 calculates SUM<N–1:N–4> as shown in FIG. 11. This most significant adder cell 202 further outputs the MSB carry-in for use by the preferred embodiment branch decision circuits as previously described. The origin of this signal is illustrated below in FIG. 12. In this particular carry-lookahead adder, the adder cells 202 have 4 bits, although the number of bits has been selected in this embodiment for illustrative convenience and other adder cell 202 sizes could be chosen. The carry-lookahead adder structure is well known in the art.

Figure 12:
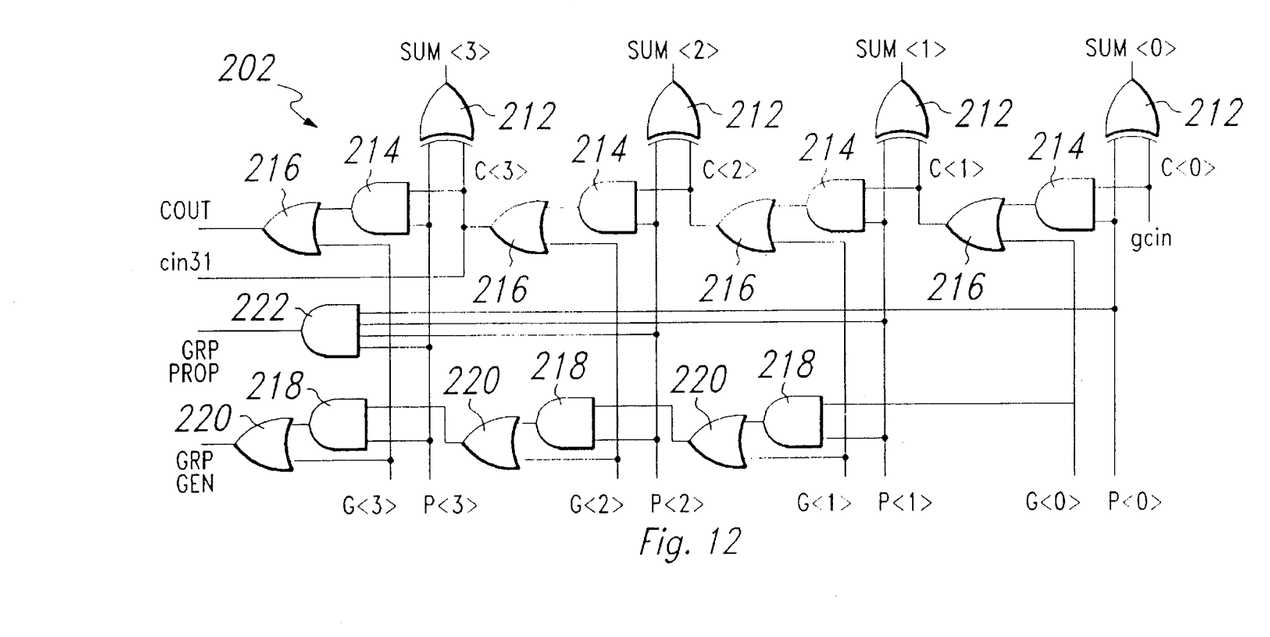
FIG. 12 is a partial schematic of an N-bit carry-lookahead adder such as could be used as for the partial sum adders shown as blocks in FIG. 11.

FIG. 12 shows the carry-lookahead adder cell 202 utilized in FIG. 11. The operation of this cell is well known in the art. As such, one-bit sums S<n> are generated by EXOR gates 212 from carry-in signals C<n> and propagate P<n> signals where n is an index variable which describes the bit position of the input signals, output signals and associated circuitry. In the case of the four bit adder cell 202 illustrated here, n will vary between 0 and 3. The C<0> signal will be the gcin from a less significant carry-lookahead adder cell 202. The C<3> signal of the most significant adder cell 202 of the embodiment of FIG. 11 will provide the cin31 signal to the preferred embodiment branch decision circuits. As mentioned before, the operation of a carry-lookahead adder cell 202 is well known in the art. As is well understood, AND-OR gate 214–216 receives G<n–1>, P<n–1> and C<n–1> and generates a carry-in signals C<n> to its associated adder cell. This portion of carry-lookahead adder cell 202 essentially the same as a ripple-carry adder. In order to minimize the number of gates through which the adder carry must ripple or propagate, AND gate 222 receives all P<n> n=0 to 3, inclusive, signals and generates a group propagate signal, GRP PROP, which is output as g shown in FIG. 11. Furthermore AND-OR gates 218–220 generate a group generate signal, GRP GEN, which is a function of P<n>, n=1,2,3 and G<n>, n=0 to 3, inclusive. Since GRP GEN, and GRP PROP is not a function of any carry-in signals including the group carry-in, gcin, the amount of delay occurred in carry rippling is much reduced. The logic shown in FIG. 12 and described hereinabove has been simplified for purposes of clarity, modifications for speed and circuit layout are obvious to one of ordinary skill in the art.

By way of examination of FIGS. 3 and 7 (first and third embodiments) in relation to FIGS. 6a, 6b and 8 (2nd and 4th embodiments) it can be seen that first and third embodiments require fewer muxes stages and hence contribute less delay in generation of the proper branch decision signal. A generalized ALU circuit 230 capable of supporting the first and third embodiments of FIG. 3 and FIG. 7 is shown in FIG.

Figure 13A:
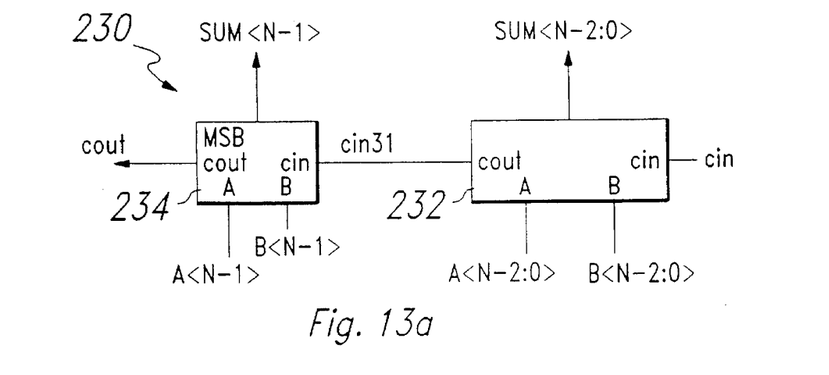
FIG. 13a–13b illustrate a generalized ALU circuit capable of supporting the embodiments of FIG. 3 and FIG. 7.
Figure 13B:
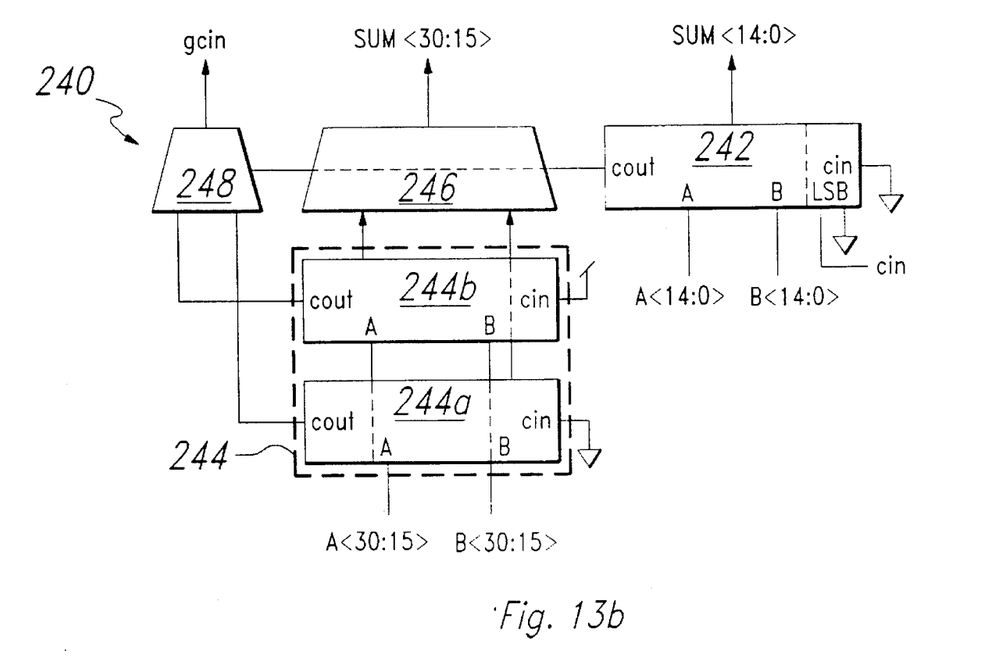

13a. It shows an N-bit ALU 230 comprising an N–1 bit ALU 232 for the least significant bits (LSB's) and a separate 1-bit ALU 234 for the single most significant bit (MSB). This division produces the cin31 signal as the carry-out of the N–1 bit ALU 232. The N–1 bit ALU 232 can be implemented within a number of different adder architectures including the carry-ripple adder/ALU, the carry-lookahead adder/ALU, the carry-select adder/ALU, the conditional sum adder/ALU, or other adder/ALUs. FIG. 13b shows a high level diagram of an N–1 bit conditional sum adder 240. If N=32 as is common in the art then the N–1 bit conditional sum adder will be a 31 bit adder with a carry-in. This can be implemented equivalently as a 32 bit adder without a carry-in in order to provide the power of 2 bit width desirable for conditional sum adders. In that case, the adder single LSB circuitry is simplified since no sum output is required and the carry generate is equal to the carry-in. An important feature of this implementation of the conditional sum adder 240 is the expedient provision of the cin31 signal to a branch decision circuit such as one of the preferred embodiment branch decision circuits described herein. The important architectural feature of this conditional sum adder which enables the expedient provision of cin31 is that the division of the adder into halves 242,244 occurs between bits 14 and 15 instead of between bits 15 and 16 as is commonly known in the art. The operation of the conditional sum adder 240 will be readily apparent to one of ordinary skill in the art upon inspection thereof. Briefly, the first half 242 of the adder 240 receives A<14:0> and B<14:0> and computes SUM<14:0> inputting at its LSB a carry-in in order to preserve the power of 2 bit width commonly used in conditional sum adders. The carry-out from the first half 242 is used as a select input of a mux 246 which selects between one of two conditional sums calculated by the first and second parts 244a,244b of the second half 244 of the conditional sum adder 240. The carry-out from the first half 242 is further used as a select input of mux 248 to select the proper carry-out from the first and second parts 244a,244b of the second half 244 of the conditional sum adder 240. The selected output of mux 248 will act as a group carry-in or gcin to subsequent adder stages as is well known in the art. Mux 246 provides the SUM<30:15> by the selection of the proper conditional sum by the carryout from the first half 242 of adder 240. First and second parts 244a,244b of the second half 244 of the conditional sum adder 240 are shown separated solely for the purpose of clarity.

Referring now to FIGS. 14a–14b, a schematic diagram of an ALU=0 circuit 250 is shown. In FIG. 14a an ALU=0 circuit 250 is shown which is operable to compute ALU=0 without regard to the actual ALU computation result, allowing an expedited ALU=0 signal to become available prior to or coincident with the ALU computation result becoming valid. In this implementation, an N-bit AND circuit 252 serves to receive N one-bit zero signals $Z_n$, n=0 to N–1, inclusive, from one-bit zero cells 254. The N-bit AND 252 circuit performs a logical AND on the N one-bit zero signals $Z_n$. As shown in FIG. 14a, each nth one-bit zero cell 254 receives $K_{n-1}$ from the next less significant one-bit zero cell 254 and outputs $K_n$ to the next most significant one-bit zero cell 254. Examination of FIG. 14b shows that each one-bit zero signal $Z_n$ is dependent only upon the signals of the nth and n–1st cell, therefore avoiding the signal rippling or propagation through all N bits characteristic of adder/subtracter circuits. $K_n$, $G_n$, $P_n$, and $Z_n$ cells 262,264,266,268 generate the signals $K_n$, $G_n$, $P_n$ and $Z_n$ (n=0 to N–1, respectively). While the $P_n$ and $G_n$ are not explicitly used for the ALU=0 signal ($Z_n$ uses $P_n$ indirectly, however other implementations could be derived), these signals are well known in the art of adder/ALU design and have been shown here for an adder for the purpose of illustration. A subtracter or an ALU would use other constructions of $K_n$, $G_n$, $P_n$, and $Z_n$ cells 262,264,266,268. These other implementations or modifications are well known in the art.

Table 5, below, provides an overview of the embodiments and the drawings:

TABLE 5

| Drawing Element | Generic Term | Preferred or Specific Term | Alternate Terms |
|---|---|---|---|
| 30 | First Prior Art Branch Decision Circuit | | |
| 32,33,34,35 | Branch Decision Signal Gate | AND Gate | |
| 36 | EXOR Gate | | |
| 37 | 3 Input OR Gate | | |
| 38 | EXOR Gate | | |
| 40 | Second Prior Art Branch Decision Circuit | | |
| 42,43,44,45 | Branch Decision Signal Gate | NAND Gate | |
| 46 | EXNOR Gate | | |
| 47 | 3 Input NAND Gate | | |
| 48 | EXOR Gate | | |
| 50 | Preferred Embodiment Branch Decision Circuit | | |
| 52,54,56,58 | Candidate Branch Decision Circuit | | |
| 62,64,66 | Selection Circuit | Candidate Branch Decision Signal Selection Mux | Candidate Selection Mux, And-Or-Invert Network |
| 70 | Condition Code Register | | |
| 72,74,76,78 | Condition Code Logic Circuit | AND Gate 76, OR Gate 78 | |
| 80,82 | Selection Circuit | Condition Code Selection Mux | And-Or-Invert Network |
| 84 | OR Gate | | |
| 86 | EXOR Gate | | |
| 88 | OR Gate | | |
| 90 | EXNOR Gate | | |
| 92,94,96,98 | Candidate Branch Decision Signal Gate | NAND Gate | |
| 100 | EXNOR Gate | | |
| 102 | NAND Gate | 3 Input NAND | |
| 104 | EXOR Gate | | |
| 110 | Condition Code Register Associated Circuitry | | |
| 112 | Selection Circuit | Condition Code Source Selection Circuit | Four Bit By Four-to-one Mux, And-Or-Invert Network |
| 114 | Four Bit By Two-to-one Mux | | And-Or Invert Network |
| 120 | Partial Second Preferred Embodiment | | |
| 122,124,126 | Selection Circuit | Candidate Branch Decision Signal Selection Mux | Candidate Selection Mux, And-or-Invert Network |
| 130 | Alternate Partial Second Preferred Embodiment | | |
| 132,134,136 | Selection Circuit | Candidate Branch Signal Selection Mux Decision | Candidate Selection And-Or-Invert Network |
| 140 | Partial Third Preferred Embodiment | | |
| 142,144,146 | Selection Circuit | Candidate Branch Decision Signal Selection Mux | Candidate Selection Mux, And-or-Invert Network |
| 150 | Partial Fourth Preferred Embodiment | | |
| 152,154,156 158,160,162 164 | Selection Circuit | Candidate Branch Decision Signal Selection Mux | Candidate Selection Mux, And-Or-Invert Network |
| 170 | Carry-select ALU | Carry-select Adder | |
| 172,174,176 | Partial Sum Adder | N-bit ripple Carry Adder | |
| 180 | Partial Sum Adder | | |
| 182 | EXOR Gate | | |
| 184 | AND Gate | | |
| 186 | OR Gate | | |
| 190 | Partial Fifth Preferred Embodiment | | |
| 200 | Carry-lookahead ALU | Carry-lookahead Adder | |
| 202 | Carry-lookahead Partial Sum Adder | | |
| 204 | AND Gate | | |
| 206 | OR Gate | | |
| 212 | EXOR Gate | | |
| 214 | AND Gate | | |
| 216 | OR Gate | | |
| 218 | AND Gate | | |
| 220 | OR Gate | | |
| 222 | Four Input AND Gate | | |
| 230 | Generalized ALU Circuit | | |
| 232 | N-1 Bit ALU | | |
| 234 | 1 Bit ALU | MSB ALU | |
| 240 | N-1 Bit Conditional Sum Adder | | |
| 242 | First Half Adder | | |
| 244 | Second Half Adder | | |
| 246 | N-1 Bit Mux | | |
| 248 | 1 Bit Mux | | |
| 250 | ALU=0 Circuit | | |
| 252 | N-input AND Circuit | | |
| 254 | One-bit Zero Cell | One-bit Zero Sum Cell | |
| 262 | $K_n$ Cell | NOR Gate | |
| 264 | $G_n$ Cell | AND Gate | |
| 266 | $P_n$ Cell | EXOR Gate | |
| 268 | $Z_n$ Cell | EXOR Gate | |

Naming conventions used for preferred embodiment circuitry assume a 32 bit ALU for illustrative purposes. Therefor the MSB is referred to as the 31st bit within the context of this document. Obviously ALU sizes other than 32 bits can be used and is therefore anticipated by the invention as set forth in the appended claims.

A few preferred embodiments have been described in detail hereinabove. It is to be understood that the scope of the invention also comprehends embodiments different from those described, yet within the scope of the claims.

"Microcomputer" in some contexts is used to mean that microcomputer requires a memory and "microprocessor" does not. The usage herein is that these terms can also be synonymous and refer to equivalent things. The phrase "processing circuitry" comprehends ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Words of inclusion are to be interpreted as nonexhaustive in considering the scope of the invention.

Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A circuit for providing a branch decision signal based on the results of an arithmetic or logic operation carried out in an associated arithmetic logic unit having as outputs alu status signals, each of said alu status signals having at least two unique states, said circuit comprising:
   a) a condition code register for storing a latched condition code;
   b) a first condition code logic circuit for computing a candidate condition code from a first alu status signal and a second alu status signal;
   c) a first selection circuit for selecting between said computed candidate condition code, received from said condition code logic circuit, and said latched condition code, received from said condition code register;
   d) a first candidate branch decision circuit for computing a first candidate branch decision signal based upon the output of said first selection circuit, and upon a first candidate value for a third alu status signal;
   e) a second candidate branch decision circuit for computing a second candidate branch decision signal based upon the output of said first selection circuit, and upon a second candidate value for said third alu status signal, whereby the value of said candidate branch decision signal from each of said first and second candidate branch decision circuits is not dependent upon the value of said third alu status signal; and
   f) a second selection circuit for selecting from said at least two candidate branch decision signals, based on said third alu status signal received from said arithmetic logic unit, the output of said second selection circuit being said branch decision signal.

2. The circuit of claim 1 and further comprising a third selection circuit for selecting one of at least two condition code sources to be input into said condition code register and selected under control of a processor.

3. The circuit of claim 2 wherein one of said condition code sources is the set of latched condition codes such that the condition codes from a prior instruction cycle might be used.

4. The circuit of claim 1 wherein said third alu status signal indicates whether the result of said arithmetic or logic operation caused a carry-in to the most significant bit of said arithmetic logic unit.

5. The circuit of claim 1 wherein said third, alu status signal indicates whether the result of said arithmetic or logic operation was zero.

6. A circuit for providing a branch decision signal based on the results of an arithmetic or logic operation carried out in an associated arithmetic logic unit having as outputs alu status signals, said circuit comprising:
   a) at least two candidate branch decision circuits, each for computing a candidate branch decision signal, each assuming a unique candidate condition code for at least one of said alu status signals, said alu status signal having at least two conditions, said at least two conditions indicating whether the result of said arithmetic or logic operation caused a carry-in to the most significant bit of said arithmetic logic unit;
   b) a multiplexer for selecting from said at least two candidate branch decision signals a branch decision signal based on said at least one alu status signal; and
   c) at least one condition code logic circuit for computing from said at least one alu status signal and from at least one other alu status signal at least two computed candidate condition codes, each computed candidate condition code being derived from a unique combination of candidate alu status signals.

* * * * *